(12) United States Patent
Jacquet (10) Patent No.: US 11,829,982 B2
(45) Date of Patent: Nov. 28, 2023

(54) SYSTEM FOR IDENTIFYING OR ASSISTING THE IDENTIFICATION OF A PRODUCT OR SET OF PRODUCTS

(71) Applicant: JES Labs, Saint Herblain (FR)

(72) Inventor: Eric Jacquet, Nantes (FR)

(73) Assignee: JES LABS, Saint Herblain (FR)

( * ) Notice: Subject to any disclaimer, the term of this patent is extended or adjusted under 35 U.S.C. 154(b) by 55 days.

(21) Appl. No.: 17/195,040

(22) Filed: Mar. 8, 2021

(65) Prior Publication Data
US 2021/0209576 A1 Jul. 8, 2021

Related U.S. Application Data

(63) Continuation of application No. 16/342,115, filed on Apr. 15, 2019, now Pat. No. 10,970,701.

(51) Int. Cl.
*G06Q 20/20* (2012.01)
*G07G 1/00* (2006.01)
*G07F 17/00* (2006.01)

(52) U.S. Cl.
CPC ......... *G06Q 20/208* (2013.01); *G06Q 20/202* (2013.01); *G06Q 20/206* (2013.01); *G07F 17/0064* (2013.01); *G07G 1/0063* (2013.01)

(58) Field of Classification Search
CPC ........ G06Q 30/06; G06Q 99/00; G06Q 20/20; G06Q 20/40; G06Q 40/00; G06Q 20/38; G06K 9/00; G06K 15/00
USPC ......... 705/7.29; 235/380–385, 375, 376, 454
See application file for complete search history.

(56) References Cited

U.S. PATENT DOCUMENTS

| | | | | |
|---|---|---|---|---|
| 5,013,896 A * | 5/1991 | Ono | ..................... | G07G 1/0036 235/377 |
| 5,497,314 A | 3/1996 | Novak | | |
| 5,992,570 A * | 11/1999 | Walter | ................... | G07G 3/003 186/36 |
| 6,769,610 B2 * | 8/2004 | Habara | .............. | G06Q 20/4014 235/382 |
| 7,076,441 B2 * | 7/2006 | Hind | .................... | G06Q 10/087 705/7.29 |

(Continued)

FOREIGN PATENT DOCUMENTS

| | | |
|---|---|---|
| EP | 2570967 | 3/2013 |
| EP | 3038015 | 6/2016 |

(Continued)

OTHER PUBLICATIONS

Preliminary search report dated Oct. 31, 2017.
(Continued)

*Primary Examiner* — Olusegun Goyea
(74) *Attorney, Agent, or Firm* — IPSILON USA, LLP (57) ABSTRACT

A system (1) is provided for identifying or assisting in identifying a product or a set of products of a user, such as the content of a meal tray (2). The system has a counter (11), a lighting system (3) for lighting the counter (11), a plurality of image acquisition devices (41, 42, 43) pointing towards the counter (11), and an identifier device (5) enabling the user to be identified. The system has a control device (7) configured to acquire the identifier (601) of the user, to acquire an image of the product or set of products with each of the image acquisition devices (4), and to associate the acquired images with the identifier.

13 Claims, 3 Drawing Sheets

(56) References Cited

U.S. PATENT DOCUMENTS

| | | | | |
|---|---|---|---|---|
| 7,143,938 | B2* | 12/2006 | Hammerle | A47F 10/02 |
| | | | | 235/382 |
| 8,106,775 | B2* | 1/2012 | Ohkawa | G06Q 20/208 |
| | | | | 340/10.5 |
| 9,082,114 | B2* | 7/2015 | Colley | G07F 19/20 |
| 9,741,241 | B2* | 8/2017 | Mizui | G08C 17/02 |
| 2003/0078849 | A1 | 4/2003 | Snyder | |
| 2005/0205677 | A1* | 9/2005 | Patel | G06K 7/10732 |
| | | | | 235/462.42 |
| 2012/0327202 | A1* | 12/2012 | Nagamachi | G07G 1/145 |
| | | | | 348/61 |
| 2014/0172610 | A1* | 6/2014 | Carpenter | G06Q 20/40 |
| | | | | 705/26.1 |
| 2015/0039458 | A1* | 2/2015 | Reid | A61B 5/117 |
| | | | | 705/26.1 |
| 2015/0194025 | A1* | 7/2015 | Tsunoda | G06T 7/73 |
| | | | | 348/150 |
| 2016/0292662 | A1* | 10/2016 | Kobayashi | G06V 10/143 |
| 2017/0316271 | A1* | 11/2017 | Saitou | G06Q 20/20 |
| 2018/0232796 | A1* | 8/2018 | Glaser | G06Q 30/0635 |
| 2018/0240180 | A1* | 8/2018 | Glaser | G07G 1/0081 |
| 2019/0114488 | A1* | 4/2019 | Glazer | G07G 1/0036 |
| 2019/0333039 | A1* | 10/2019 | Glaser | G06Q 20/209 |
| 2020/0134590 | A1* | 4/2020 | Glaser | G06Q 20/204 |
| 2020/0184445 | A1* | 6/2020 | Biggs | G06Q 20/3821 |

FOREIGN PATENT DOCUMENTS

| | | |
|---|---|---|
| JP | H07234896 | 9/1995 |
| JP | 2009176209 | 8/2009 |
| WO | 2013/039393 | 3/2013 |

OTHER PUBLICATIONS

Search report dated Jun. 22, 2017.
Search Report dated Jan. 19, 2018.
Counterpart European patent procedure dated Apr. 3, 2023.

* cited by examiner

SYSTEM FOR IDENTIFYING OR ASSISTING THE IDENTIFICATION OF A PRODUCT OR SET OF PRODUCTS

RELATED APPLICATION

This application is a continuation of U.S. patent application Ser. No. 16/342,115, filed on Apr. 15, 2019 which in turn is a National Phase of PCT/FR2017/052752 filed on Oct. 9, 2017, which claims the benefit of priority from French Patent Application Nos. 16 60187, filed on Oct. 20, 2016 and 17 57109 filed on Jul. 26, 2017, the entirety of which are incorporated by reference.

FIELD OF THE INVENTION

The present invention relates in general manner to identifying or assisting in identifying a user's product or set of products, such as the content of a meal tray.

An advantageous application of the present invention lies in the field of collective catering, but naturally the present invention may be applied to other fields in which it is desired to identify or assist in identifying a user's product or set of products.

PRIOR ART

In the field of collective catering, users generally take a meal tray on which they place various products for consuming, and then they go to a checkout.

When a user reaches the checkout, the checkout operator identifies and enters into a system the products that correspond to the content of the tray. The products that are entered correspond to a sum that the user is to pay.

Generally, the user presents a badge associated with an account that is debited by the amount to be paid. It is observed on average that the number of trays passing through the checkout per minute is low, of the order of six.

It can be understood that it would be desirable to be able to reduce the waiting time of users in such canteens.

Systems are known in the state of the art, and in particular from documents EP 3 038 015, U.S. Pat. No. 5,497,314, and WO 2013/039393, that enable products to be identified automatically and then enable an amount corresponding to those products to be paid, in cash or using a payment card.

It is nevertheless desirable to be able to further reduce the time taken by users to pass through such a system, while benefiting from images of the products that can be used reliably for identifying or assisting in identifying those products correctly.

An object of the present invention is to propose a system that enables the above-described problems to be mitigated in full or in part.

SUMMARY OF THE INVENTION

To this end, the invention provides an identification or assistance in identification system for identifying or assisting in identifying a product or a set of products of a user, such as products corresponding to the content of a meal tray, said identification or assistance in identification system comprising:
  a counter for receiving said product or set of products;
  a lighting system for lighting the counter;
  a plurality of image acquisition devices pointing towards the counter so as to acquire images of said product or set of products at different viewing angles; and
  a display screen;
  the identification or assistance in identification system being characterized in that it further comprises:
  a first database storing user account data, each user account comprising:
    an identifier of a user;
    a credit or debit balance value;
  an identifier device enabling the user to be identified; and
  a control device configured:
    to acquire an identifier of the user;
    to determine whether the acquired identifier of the user corresponds to the identifier of the user of a stored user account;
    to acquire images of said product or set of products by using said image acquisition devices; and
    to associate the acquired images with the identifier of the user in a second database.

The term "product" is used to mean a physical object that the user can handle. Said product may optionally be of edible type.

In a collective canteen, where the product or the set of products corresponds to the content of a tray, the system of the invention serves to accelerate and make more fluid passage through the checkout formed by said system.

In particular, using a plurality of image acquisition devices makes it possible to benefit from images of the product or the set of products that are taken from different angles so as to be able to identify reliably said product or set of products.

In addition, associating the identifier of the user with those images makes it possible to manage effectively and reliably the purchase of the product(s) by the user and also to monitor use of the system.

Such a design for the system allows the person to put down the tray and enables the operations of acquiring the identifier, of acquiring the images, and of associating them to be performed with the person then being able to leave the station to go away and eat without that person having any need to go to a distinct second station, with the exception of certain particular situations, e.g. when the user is not recognized. Under such particular circumstances, the user may be invited by corresponding messages displayed on the screen to go to a specific treatment station where an operator is present.

In a particular aspect, the system issues authorization to leave the station and go away and eat (nominal situation) or else an invitation to go to another location, e.g. a specific treatment station (particular situation), which is done by means of a displayed message and/or by issuing a visible and/or audible signal, and/or by issuing a control signal to a mechanical system for controlling passage, e.g. by unlocking a barrier.

The image acquisition devices, the lighting system, and the counter for receiving a tray may form part of a single structure in the form of a station (or terminal), with the user taking up a position in front of it in order to put down the product or the set of products. The other elements of the system may optionally be integrated in the station.

According to an advantageous characteristic of the invention, the control device is also configured, after the identifier has been associated with the acquired images, to control a device for authorizing exit or for issuing an indication so as to allow or invite the user to take away his or her products.

According to an advantageous characteristic of the invention, the station has a back face that extends substantially orthogonally to the counter for receiving a tray. Advantageously, the back face is configured to diffuse light coming from the lighting system.

In particular, diffusing light by means of the back face serves to improve the uniformity with which lighting is distributed over said set of products by limiting the size of shadow zones and by limiting the presence of reflected glare.

The counter is connected so as to diffuse as little received light as possible so as to limit the amount of light coming from the lighting system that is returned to the image acquisition devices pointing at said counter and so as to ensure sufficient contrast with said products that are to be identified.

According to an advantageous characteristic of the invention, the station has a back face that extends substantially orthogonally to the counter, said image acquisition devices comprising a first image acquisition device having its optical axis pointing vertically, and two other image acquisition devices arranged on either side of a plane containing the optical axis of the first image acquisition device and perpendicular to the back face of the identification system.

Such an arrangement of the image acquisition devices, e.g. comprising motion picture cameras, makes it possible to obtain images from different angles in order to identify reliably the product(s) that is/are present. In particular, such an arrangement makes it possible to identify effectively with at least one of the image acquisition devices a product that is masked by another product in the field of view of another image acquisition device.

According to an advantageous characteristic of the invention, the system includes a third database containing datasets referred to as orders, each dataset comprising the identifier of the user and a value corresponding to the sale price of said product or set of products.

According to an advantageous characteristic of the invention, the lighting system comprises lighting devices and a light diffusion device, such as a translucent plate, e.g. made of Plexiglass.

Diffusing light by means of the diffusion device serves to obtain a uniform distribution of light and limits the presence of shadows and/or of reflected glare that might appear in the images and impede making use of them.

According to an advantageous characteristic of the invention, each user account contains user rights information for indicating whether or not the user associated with the user account is authorized to use said identification or assistance in identification system; and the control device is configured, after determining the user account that corresponds to the acquired user identifier, to authorize or to refuse the use of the system as a function of the user rights information associated with said user account.

According to an advantageous characteristic of the invention, at least one of the image acquisition devices serves to provide a video stream, and the control device is configured:
to detect said product or set of products being placed on the counter; and
to display on the screen the video of the product or the set of products present on the counter, together with information defined as a function of the position of the product or the set of products relative to the counter to indicate whether the product or the set of products is positioned correctly.

According to an advantageous characteristic of the invention, the control device is configured, on the basis of the images of the video stream and as a function of at least one predefined rule, to determine whether the product or the set of products is or is not correctly positioned relative to the counter.

According to an advantageous characteristic of the invention, the control device is configured to authorize or to refuse the acquisition of the user identifier by means of the identification device as a function of the positioning state of said product or set of products relative to the counter.

According to an advantageous characteristic of the invention, the control device is configured to trigger the acquisition of images of said product or set of products as a function of characteristics of the acquired user identifier.

According to an advantageous characteristic of the invention, the system includes a back face that extends substantially orthogonally to the counter, the back face absorbing daylight less than the counter, and said image acquisition devices comprise a first image acquisition device having its optical axis oriented perpendicularly to the counter, and second and third image acquisition devices arranged on either side of a plane containing the optical axis of the first image acquisition device and perpendicular to the back face, the optical axes pointing towards the counter and sloping in mutually opposite directions relative to the optical axis of the first image acquisition device.

The back face absorbs less natural light than does the counter. Preferably, the lighting system emits light of daylight type, e.g. having a color temperature of about 6400 K. The light emitted by the lighting system is thus absorbed less by the back face than it is by the counter. The back face is matte in order to diffuse light well and ensure good uniformity of the lighting. Advantageously, the counter is matte in order to avoid the appearance of glare.

According to an advantageous characteristic of the invention, at least one of the image acquisition devices serves to deliver a video stream, and in order to perform the step of acquiring images, the control device is configured to extract an image from said video stream acquired by one of the image acquisition devices.

According to an advantageous characteristic of the invention, each image acquisition device comprises a CCD sensor, and the control device is configured to detect ambient brightness and to adjust the sensitivity of the CCD sensors as a function of the measured ambient brightness.

According to an advantageous characteristic of the invention, the light diffusion device presents a face facing towards the counter, which face is curved.

Having a curved face for the diffusion device that points towards the counter enhances good distribution of light flux over said set of products to be identified.

According to an advantageous characteristic of the invention, the counter is made as a single piece and presents, beside the back face, a raised edge limiting any risk of infiltration into the station.

According to an advantageous characteristic of the invention, the control device is also configured to use the acquired images associated with the user identifier in order to identify at least a portion of said set of products.

BRIEF DESCRIPTION OF THE DRAWINGS

Other characteristics and advantages of the invention appear further from the following description, which is purely illustrative and non-limiting, and which should be read with reference to the accompanying drawings, in which.

DETAILED DESCRIPTION

The concept of the invention is described more completely below with reference to the accompanying drawings, which show embodiments of the concept of the invention. In all of the drawings, similar numbers refer to elements that are similar. Nevertheless, the content of the invention can be implemented in numerous different forms and the invention should not be interpreted as being limited to the embodiments described herein. On the contrary, these embodiments are given so that the description is complete and communicates the extent of the concept of the invention to the person skilled in the art. Consequently, the extent of the invention is defined by the accompanying claims. For simplification purposes, the embodiments below are examined in association with the terminology and the structure of a station for assisting in identifying or for identifying the content of a meal tray. Nevertheless, the embodiments described below are not limited to such an application of identifying or assisting in identifying the content of a meal tray, but may be applied to identifying or assisting in identifying any product or set of products, with or without a container.

Throughout the description, any reference to "an embodiment" means that a particular characteristic, structure, or function described with reference to an embodiment is included in at least one embodiment of the present invention. Thus, the use of the term "in an embodiment" in various locations throughout the specification does not necessarily refer to the same embodiment. In addition, the particular characteristics or structures or functions may be combined in any appropriate manner in one or more embodiments.

The figures show a system for identifying or assisting in identifying a product or a set of products corresponding to the content of a meal tray 2. The description below refers to a set of products, but naturally it also applies to a single product.

The system comprises a station 1 and one or more databases 700, 800, 900, which may be local or remote. In particular, the or each database may be located in the station 1 or elsewhere, e.g. in a server with which the station 1 is suitable for communicating. In particular, the or each database is stored in a memory that may be included in the station or elsewhere.

Figure 1:
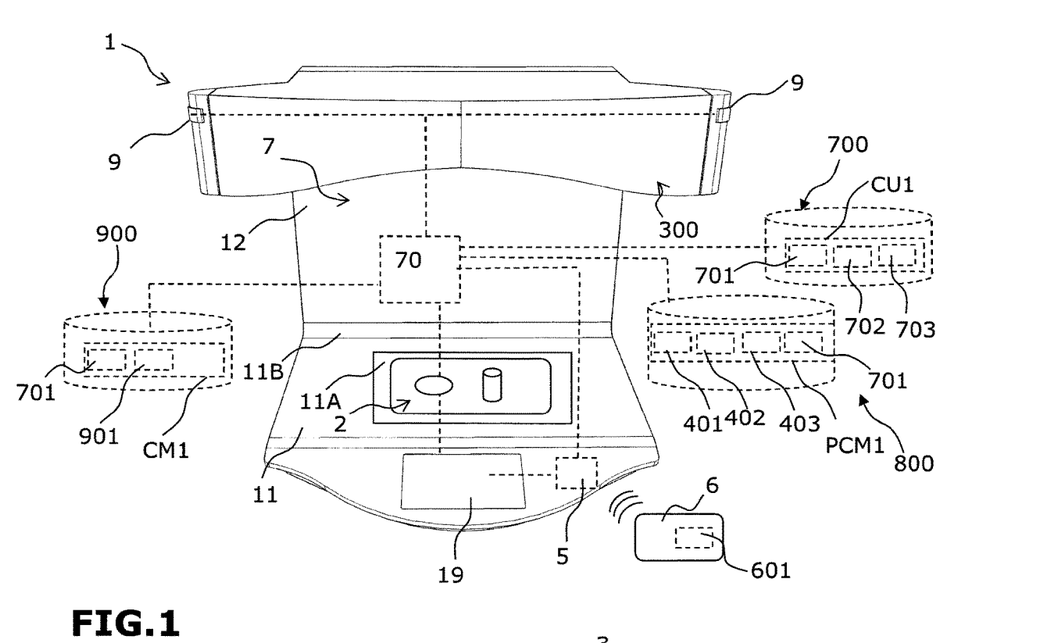
FIG. 1 is a perspective view of a system comprising a station into which a user inserts a tray with its content, a badge reader, and databases, in accordance with an embodiment of the invention.

In the example shown in FIG. 1, three databases 700, 800, and 900 are shown diagrammatically. These databases may be stored in a single memory or in a plurality of distinct memories.

The first database 700 contains account data for predefined users. In the example of FIG. 1, only one user account CU1 is shown diagrammatically, but naturally a plurality of user accounts (not shown) are defined within the database 700.

Each user account CU1 contains an identifier of a user 701 of the account and a value of the credit or debit balance 702 of the account. In a preferred embodiment, each account is a private electronic banking account.

In a particular aspect, each user account CU1 also contains other information, such as user rights information 703. By way of example, the user rights information 703 may indicate whether the user is or is not authorized to use said identification or assistance in identification system. Specifically, it is possible to make provision for a user to be authorized to access a given station present in a canteen, but not some other station that is present in some other canteen.

The user rights information may contain one or more data entries enabling the control device:

to validate a general right to use one station from among a plurality of stations; and/or to verify the status of the account: e.g. "valid", "closed"; and where appropriate, to verify the status of the hardware medium of the badge user identifier: e.g. "lost", "active", or "inactive".

The control device causes a message to be displayed on the screen as a function of this data.

Advantageously, the user account includes data corresponding to a number of passes allowed, i.e. the number of times the cycle of acquiring an identifier and acquiring images can be carried out before the account is debited. Provision may thus be made for the control device to prevent a new cycle being carried out when the number of passes allowed has been reached and the account has not been debited, and the control device causes a corresponding message to be displayed on the screen.

Thus, when this number of passes is set to 1, the user can pass only one tray through the station, thus avoiding a user passing some undetermined number of trays when the user's account is not sufficiently provisioned. Specifically, since the account is debited in a manner that is not synchronized relative to the cycle of acquisition and association steps performed in the station, taking account of a given number of authorized passes in association with taking account of a balance threshold value for enabling the system to be used, serves to reduce situations in which the system could be used fraudulently.

In an embodiment, each user account also has information about the station(s) that the user is or is not entitled to access. By way of example, provision may be made for this information to be an identifier of a station that may be accessed by the user.

The second database 800 is described below.

The station has a counter 11 for receiving the tray. For this purpose, the database may include identifier means, e.g. visual and/or hardware means for positioning the tray. In a variant, or in addition, provision may be made for the identifier means to be displayed on a screen at the same time as the image is being taken of the tray and of its content when the tray is put onto the counter. An embodiment of such assistance in positioning by means of a display screen is described below.

Figure 2:
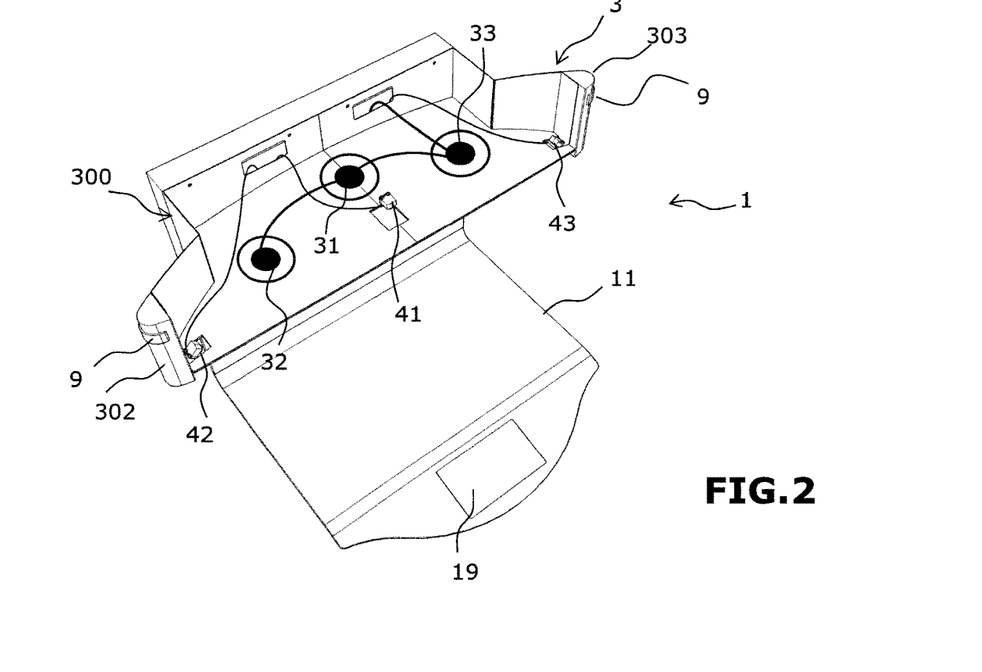
FIG. 2 is a perspective view of the FIG. 1 station in an embodiment of the invention, a portion of the bodywork of the station being removed in order to show the lighting system and the image acquisition devices.

The station has a lighting system 3, shown in FIG. 2, for the purpose of lighting the counter 11 for receiving a tray. Said lighting system 3 thus serves to light said set of products when it is placed on the counter 11. As described in detail below, the station 1 is configured to provide good lighting conditions so as to enable good quality images to be taken that can be used in effective manner. As shown in the figures, the lighting system 3 is arranged above the counter 11 for receiving a tray.

The lighting system 3 has lighting devices 31, 32, 33 and a light diffuser device 34, such as a translucent plate, e.g. made of Plexiglass. Advantageously, the lighting devices 31, 32, and 33 are arranged at the corners of a triangle or as a circular arc. The lighting devices may for example be light-emitting diodes (LEDs). The lighting devices may be arranged to provide direct or indirect lighting, e.g. they may point towards the top portion of the chamber 300 (described below).

In the example shown in the figures, the light diffuser device 34 presents a curved face facing towards the counter 11 for receiving a tray. The center of the curve is situated beside the counter. In other words, seen from the counter, the diffuser device presents a face that is concave.

The station has a set 4 of image acquisition devices. In the description below, each of the image acquisition devices is a camera 41, 42, 43 that can acquire a video stream, i.e. a motion picture of the zone towards which the camera is pointed. Each camera 41, 42, 43 also serves to acquire an image. In a particular embodiment, each camera can acquire an image by extracting that image from an acquired video stream. In a particular aspect, each camera is a charged-coupled device (CCD) camera.

Thus, in the description below, each image acquisition device is a motion picture camera, but the description applies equally well to other types of image acquisition device, and in particular to cameras other than CCD cameras.

In a particular aspect, seen from above the station, i.e. in projection onto a plane parallel to the counter 11, the lighting devices 31, 32, and 33 are situated between the back face 12 and the image acquisition devices 41, 42, 43.

Figure 3:
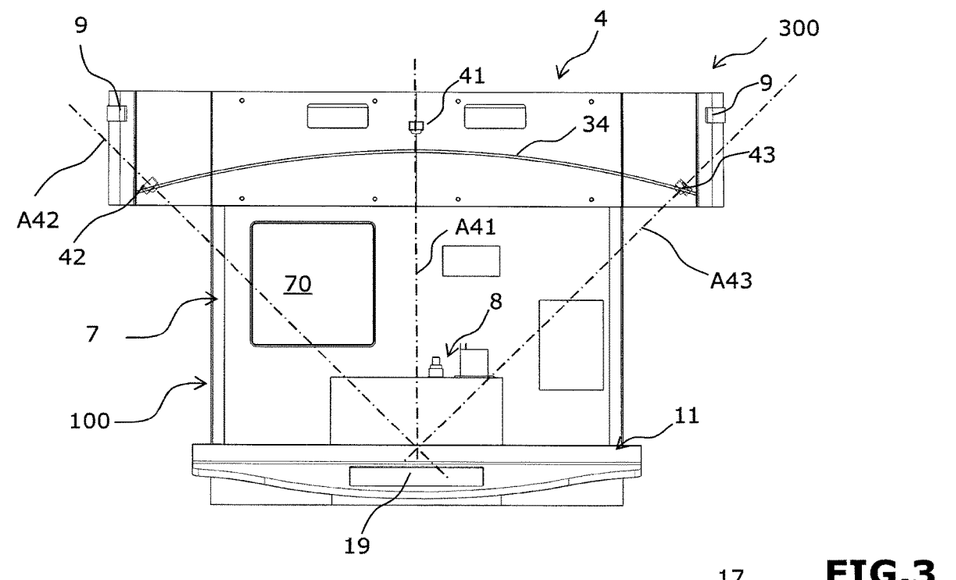
FIG. 3 is a face view of the FIG. 1 station in accordance with an embodiment of the invention, a portion of the bodywork of the station being removed in order to show the orientation of the image acquisition devices, the lighting system not being shown.
Figure 4:
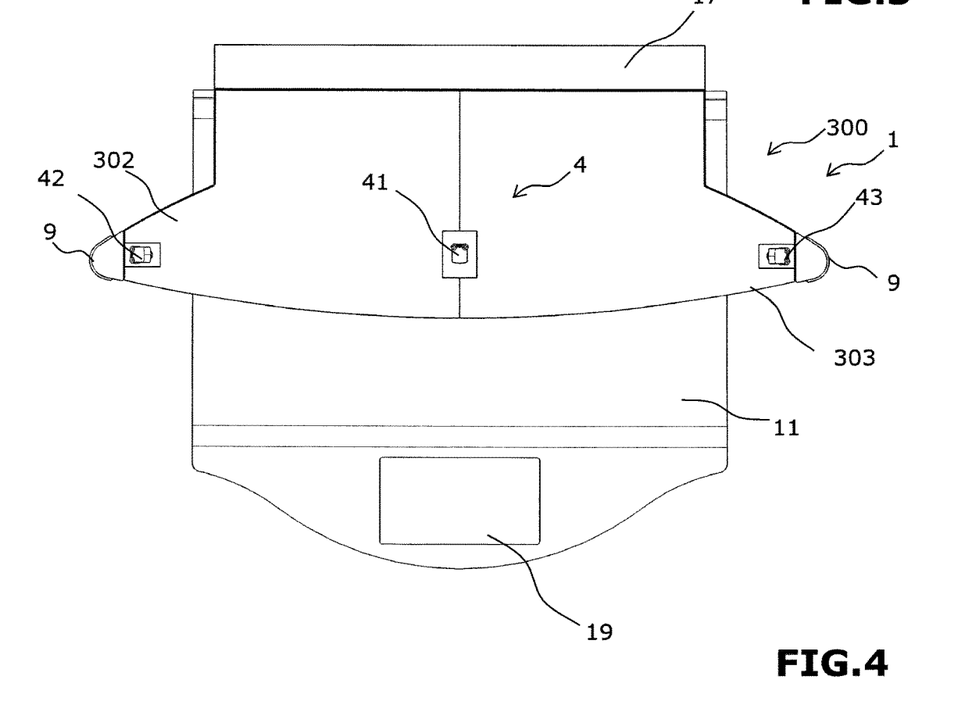
FIG. 4 is a plan view of the FIG. 3 station.

In an embodiment shown more particularly, in FIG. 3, the cameras 41, 42, and 43 point towards the counter 11 for receiving a tray along different optical axes in order to be able to acquire images of the tray from different angles.

The station 1 has a back face 12 that extends substantially orthogonally to the counter 11 for receiving a tray. The back face 12 is selected so as to present low absorption of daylight (or natural light) or of the light coming from the lighting system, in comparison with the counter 11. Preferably, the back face 12 is matte, e.g. matte white. In an embodiment, the counter 11 is darker than the back face 12. In a preferred embodiment, the counter 11 is of a gray color to distinguish reliably between the counter 11 and the content of the tray and also the tray itself. In a particular aspect, the counter is matte. The back face presents diffusive reflection of daylight and/or of the light from the lighting system that is greater than that obtained from the counter.

In an embodiment, the camera 41 has an optical axis A41 pointing perpendicularly at the counter 11, i.e. vertically. This camera 41 thus serves to film and/or take an image of the top of the content of a tray. Two other cameras 42 and 43 are arranged, preferably symmetrically, on either side of a plane containing the optical axis A41 of the camera 41 and extending perpendicularly to the back face 12.

Such a distribution of the cameras 41, 42, and 43 enables all of the products to be seen from two opposite sides and from above in order to obtain sufficient information to be able to identify each product reliably, in spite of one product possibly masking another, or in spite of one product, when seen at a given angle, resembling another product.

The cameras 42 and 43 preferably point in such a manner that their optical axes A42, A43 form an angle relative to the vertical that lies in the range 40° to 50°, and is preferably 45°.

In a particular embodiment, at least one of the cameras, preferably the top camera 41, films continuously. The control device 7 (described below) is configured to detect a tray and its content being inserted into the field of the camera and to display in real time the corresponding video on a display screen 19.

An object entering into the field of the camera may be detected by analyzing the filmed image by using an image analysis module included in the control device.

Information is also displayed on the screen 19, e.g. in superposition, so as to enable the tray and its content to be positioned correctly and quickly. This information is defined in such a manner as to:
guide the user in positioning the tray and possibly its content; and/or
indicate whether the tray is or is not correctly positioned; and/or
indicate what corrections need to be carried out.

Monitoring correct positioning of the tray and its content on the counter 11, in combination with good lighting conditions, and taking images from different angles, contributes to obtaining images that can be used for identifying effectively the products that are present in each of those images.

The invention thus makes it possible in a short length of time to obtain images of products that can be used reliably and effectively since, firstly, the system detects the presence of a tray and informs the user if the tray is positioned correctly, and secondly the images provide different viewing angles of said products, with these images also being obtained under good lighting conditions, specifically because of the particular configuration of the back face and of the counter.

By combining different particular directions for the cameras and such a particular configuration in terms of diffusing light from the back face relative to the counter, serves not only to obtain images of the products from a plurality of viewing angles, but also, both for the lateral cameras and for the top camera, to reduce the presence of shadows or glare in each image, whether it comes from the lateral cameras or from the top camera, and while also providing sufficient lighting. Specifically, the back face 12, which diffuses light, does not lie in the field of the cameras, unlike the counter 11, so that light is diffused by the back face 12 towards the content of a tray with reduced risk of any glare being present in the images 401, 402, 403, which might impede identifying products.

It should be observed that such a configuration for the back face 12 and for the counter 11 is particularly advantageous when the image acquired of said products by a camera is an image that has been extracted from a video stream from the camera. Specifically, in order to be able to make correct use of an image extracted from a video stream, it is necessary for the video stream to be acquired under good lighting conditions.

In an embodiment, the optical axes A41, A42, and A43 of the cameras 41, 42, and 43 are substantially coplanar. The plane in which the optical axes A41, A42, and A43 extend is preferably parallel to the mean plane formed by the back face 12.

An identifier device 5, shown diagrammatically in FIG. 1, serves to identify the bearer of the tray. By way of example, the identifier device 5 is a badge reader. In an embodiment, the user has a badge 6 that includes an identifier 601 such that the badge reader can read and thus acquire the identifier 601 of the user when the user is present in front of the station. By way of example, the badge reader is a contactless reader. Naturally, the user identifier could be obtained other than by reading a badge. By way of example, the user identifier could be biometric data.

The station also has a control device 7 configured to carry out various operations. In particular, the control device is configured to control the identifier device 5 in order to acquire the identifier 601 of a bearer of a tray. The control device also serves to control the electrical and/or electronic elements of the station, in particular the image acquisition devices 41, 42, and 43, the display screen 19, and the lighting system.

Thereafter, the control device 7 associates the acquired images with the acquired identifier in a database, which may be local or remote.

By way of example, the control device 7 comprises:
a processor and calculation unit 70, such as a computer, a tablet, or a unit of some other type including a processor;
a block of internal peripherals for interfacing the peripherals of the station with the processor unit. By way of example, said peripherals may comprise the image acquisition devices, such as cameras, sensors, the lighting system, display lights, a printer, etc. . . . ;
a block of external peripherals for interfacing the station with a data communication network and with external peripherals, such as an access gate; and
an electrical power supply.

The control device 7 has a memory storing an identifier corresponding to the station for which it controls the various electrical or electronic elements, such as the cameras 41, 42, 43, the identifier device 5, the display screen 19, and optionally the lighting system 3. The control device also communicates with the first database 700 from which it receives the user account data.

The control device can thus compare the acquired user identifier with the user account data in order to determine whether there exists a stored user account corresponding to said user identifier. If so, the control device can compare the identifier of the station that it contains in memory with the station identifier associated with the user account in order to determine whether the user has the right to make use of this station.

The images 401, 402, and 403 of the set of products as acquired by the cameras 41, 42, and 43 are associated in the second database 800 with the identifier 701 of the user, after verifying that the acquired user identifier 601 does indeed correspond to the user identifier 701 of a user account predefined in the first database 700. Reference is made to associating the images with the user identifier 701, however it should be understood that it would be equally possible to refer to the user identifier 601 corresponding to the user identifier 701. The order in which the images 401, 402, and 403, and the identifier 601 are acquired may vary depending on the embodiment. Various embodiments are described below. The images 401, 402, and 403, and the identifier 701 thus form part of or constitute a dataset PCM1, also referred to as a "pre-order", that may be used for managing the purchase of said set of products. A pre-order is thus stored in the database 800 each time a user passes through the station.

It can be understood that the images and the identifier may be stored by being copied directly into the database 800 or by using forwarding data, e.g. a link giving access to an image stored other than in the memory of the database. In a particular aspect, the images may be subjected to processing between being acquired and being stored in the database 800.

Thus, the second database 800 contains datasets that include, for each acquired user identifier that corresponds to a user identifier for a user account, the images as acquired, which are associated with said user identifier. It is thus possible subsequently to retrieve the acquired images by using the user identifier.

Advantageously, the control device compares the balance with the threshold value associated with the account and displays warning information on the screen when the balance is below said threshold value.

Provision may be made for the value of the balance to be displayed on the screen 19 after the identifier device 5 has acquired the user identifier and the control device has determined the corresponding stored user account.

In an embodiment, once the identifier has been acquired and the corresponding user account has been identified, the screen 19 displays the balance prior to debit. Displaying this balance information serves to keep the user looking at the screen in order to follow the information displayed on the screen. As explained above, this information may for example be an invitation to take the tray and go away to eat (nominal situation) or else to go to some other station (particular situation).

The control device 7 is also configured, so that after the identifier has been associated with the acquired images, it controls an exit authorization or indication device 9 to authorize or invite the user to pick up the tray (to go away and eat).

In other words, when user identification has been performed and the images have been acquired, the station issues a validation signal that can be interpreted by a controller, which controller may be either a physical person (when the validation signal is an indicator light—ticket to be shown) or a mechanical access control system, such as a gate.

In the example shown in the figures, the authorization device 9 has indicator lights shining with a given color, e.g. green, once the processor and calculation unit 70 causes the indicator light(s) to shine with said color corresponding to authorization to leave or to validation of passage.

Using an indicator light as an authorization (or validation) device enables the process to be supervised by a supervisor. Provision may also be made for said indicator light to identify the status of the station (open for service or closed).

Permission to remove the tray is validated by the control device once the acquired image of the tray and the identifier of the bearer of the tray have been associated with each other. Advantageously, and as explained above, an additional condition for validation may be that the identifier corresponds to a user entitled to use the canteen associated with the station. An additional condition for validation may also be that the user account corresponding to the identifier presents credit and/or allows sufficient debit. Thus, a predetermined credit threshold for the account or a maximum authorized debit may be included as a validation parameter.

In an embodiment, the control device 7 is also configured to use the acquired images associated with the identifier of the user to identify at least some of the content of the tray 2. At least some of the content of the tray can be identified in particular by shape recognition. Provision may also be made for identification to be performed remotely by a physical person making use of the acquired images associated with the identifier of the user.

Advantageously, a so-called "enrollment" stage is performed initially. The enrolment stage corresponds to a stage that is performed before the station is used by a user having a tray, and in which the various products that might be present on the tray, e.g. the various dishes of the day, are stored in a database by acquiring their images, preferably using the station, and by associating them with identifiers, preferably a corresponding numerical amount or by associating them with predefined data. The content of a tray (usually carrying a plurality of products) is then identified after comparing the images acquired of the content on the tray with the reference images of products previously stored during said enrollment stage.

Advantageously, the counter 11 for receiving a tray is made as a single piece, and beside the back face 12 it presents a raised edge 11b limiting any risk of infiltration into the station. Said side of the back face 12 corresponds to the side of the station remote from the place where the bearer of the tray is present when facing the station.

The station 1 has a chamber 300 that contains the lighting devices 31, 32, and 33 and also the image acquisition devices 41, 42, and 43.

Said chamber 300 extends above and is spaced apart from the counter 11 for receiving a tray. The chamber 300 and the counter define between them a tray insertion space that is open both laterally and in its front face, as contrasted with its back face.

Said chamber 300 presents a front portion of width greater than the width of the counter. The width of said chamber 300 corresponds to a dimension measured in a direction parallel to the axis connecting together the open lateral faces of the station, as contrasted with the height and the depth of said station.

To this end, the front portion of the chamber 300 has a top wall 330 and peripheral walls 320 and 340, in particular with lateral portions referred to as "ears" 302 and 303 that serve to maximize the various viewing angles and the lighted area, while minimizing the volume needed for integration and visual impact. The diffusion face 34 forms the bottom face of said chamber 300.

Figure 5:
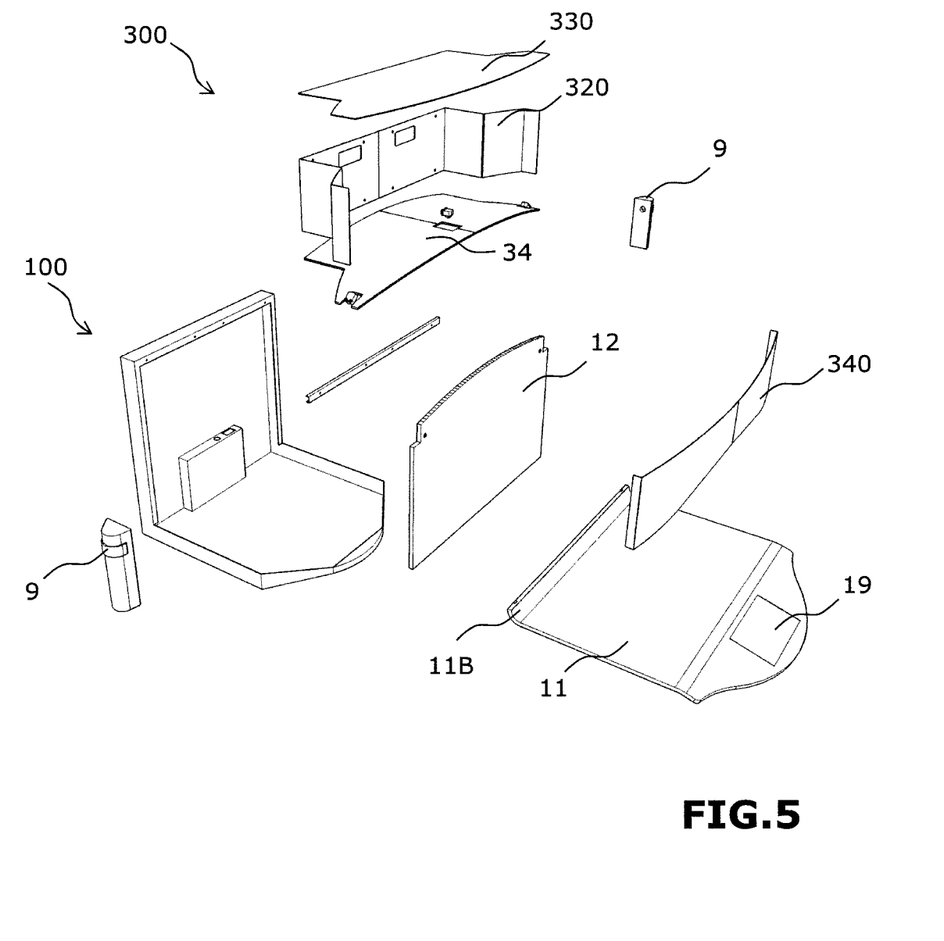
FIG. 5 is an exploded view of the FIG. 1 station in accordance with an embodiment of the invention, the lighting system not being shown.

As shown in FIG. 5, the station 1 comprises a frame 100. The frame 100 is L-shaped and preferably made as a single piece for providing stiffness to all of the elements and for enabling any type of implementation: placed on or incorporated in a piece of furniture, placed on a stand or a post, or fastened to a wall.

A space is defined between the frame 100 and the back face 12 and/or the base 11 in order to integrate all of the technical elements within the structure so as to avoid having any cables or connections that are apparent and that might give rise to problems of safety and/or of hygiene.

A secure terminal unit 8 (made secure to limit unwanted access to the connections) serves to connect the station to the external peripherals and to the network without opening the station while nevertheless providing protection against abusive handling.

Advantageously, the back face 12 and/or the counter 11 are removable from the frame 100. The fact of making provision for the base and/or the back face 12 to be removable at least in part and thus exchangeable serves to make the system easier to clean. The fact that the face 12 and/or the base 11 can be removed at least in part also facilitates access to the active components of the station, thereby simplifying maintenance.

The station is in the form of a structure having lateral faces and a front face that are open in order to make it possible to insert and remove a tray in fluid manner.

Said station 1 has a system for communicating with the user, preferably an interactive system. As explained above, the communication system comprises the display screen 19. In an embodiment, the communication system also has an interface for interactive communication with the user. By way of example, the interactive communication interface may comprise a touch-sensitive layer on the screen, and/or a microphone, and/or a loudspeaker.

As explained above, the screen 19 enables the user to see how the tray 2 is positioned relative to a zone 11A marked on the counter 11 for receiving a tray. In an embodiment, the display screen 19 displays the image of the tray together with its content and may indicate to the user the position that is to be reached by the tray and its content, e.g. by displaying an outline within which the image of the tray and its content should be situated. According to a particular aspect, the control device is configured to determine whether the tray and its content are properly positioned inside said outline and to display information about the state of positioning and/or information about correcting positioning so as to enable the user to position the tray correctly and quickly.

Provision may also be made for the screen to form an interface serving to validate and/or correct information when the products present on the tray are recognized automatically. One or more rules may be predefined in the control unit. For example, the positioning of the tray or of its content may be considered to be incorrect when the tray is not contained entirely within an outline displayed on the screen and/or marked on the counter 11.

The communication system also includes the identifier device 5 for identifying the user, as described above, that serves to collect identifiers from badges or other media, e.g. of electronic type, such as a smartphone, or biometric information.

In the example shown in the figures, the bottom front portion of the station that receives the display screen 19 is in the form of a plane that is adapted by its angle of inclination and its curved shape so as to be easily accessible to the user. Such a design serves to avoid reflections, and makes the station accessible to a person who is handicapped.

Said station has a cooling system operating by natural convection that is arranged to cool at least a portion of the control device. The natural convection cooling system serves to avoid adding a fan, thereby reducing energy consumption, reducing noise, and reducing any risk of breakdown. Advantageously, the cooling system is integrated between the frame and the back face 12, and advantageously includes low and high air access grilles 17.

Various ways of operating the station can be envisaged, some of which are described below.

In a first implementation, the step of identifying the user triggers image acquisition. Such an implementation serves to optimize the time required to pass through the station and the ergonomics of the station. The number of actions to be performed by the user is reduced and the user benefits from the comfort associated with being identified after putting down the tray. In addition, data processing takes place in a manner that is fluid since it is not interrupted. In a particular aspect, the images are acquired only if the user identifier is recognized.

Provision may be made for image acquisition to be conditional on the user identifier corresponding to an identifier of a known user account and possibly with the fact that the user identifier is associated with authorization to use the system. Provision may be made for the image to be acquired independently of the balance and for the balance to be verified subsequently, so that if the balance is not sufficient, the user can be informed that the account needs to be topped up or can go and pay at a distinct special station. In a particular aspect, such a distinct special station is configured to access the pre-order, in particular the acquired images associated with the user identifier, so as to enable an operator using the user identifier to recover the images of all of the user's products in order to determine the amount to be paid. In a particular aspect, and as explained below, the amount to be paid is to be stored in a dataset, referred to as an order, which dataset includes the user identifier corresponding to the pre-order.

The third database 900 contains datasets referred to as orders. Each order comprises the user identifier and a value corresponding to the sale price of said product or said set of products. Thus, the order CM1 shown in FIG. 1 comprises the user identifier 701 and a value 901 corresponding to the sale price of said product or set of products. In a particular aspect, an order is generated after a pre-order has been generated. In an implementation, the product or each product in said set of products is determined from the images that have been acquired, and the price associated with said product or with each product of said set of products, e.g. stored in a database, is then added to the order from a database listing the prices of the product(s). The product(s) may be identified by recognition software on the basis of the images or with the help of a presentation interface that displays the images of a pre-order and that enables an operator to define the product(s) identified by the operator in the images. Each product is associated with a price.

The total price stored in the order can then be debited from the corresponding user account.

An implementation is described below. The user comes up to the station 1 with a tray. The user places the tray on the counter 11 and the image filmed by one or more of the image acquisition devices is displayed on the screen to enable the user to see how the tray is positioned. Once the tray is correctly positioned, provision may be made for the screen 19 to display a message validating the positioning of the tray.

The display screen and/or other equipment of the station prompts the user to identify him- or herself. Once the user has been identified, the control device triggers acquisition of the image of the tray and associates the image with the identifier in a database. A signal authorizing exit or validating passage is then issued by the station. By way of example, this signal may be a visual signal, the printing of a ticket, and/or sending an open command to a gate.

In another implementation, acquisition of the image of the tray is triggered before identifying the user, either by the user being prompted by the display on the screen, or else by the system triggering acquisition automatically. Thereafter, the display screen prompts the user to identify him- or herself.

In another variant embodiment, identification is performed independently of the positioning of the tray. Thus, the user is identified after placing the tray on the counter or while still holding the tray. Identification of the user triggers monitoring of the positioning of the tray. Once proper positioning of the tray on the counter has been validated, acquisition of each image of the tray is triggered, either by an action by the user in response to a prompt displayed on the screen, or else by the system automatically triggering acquisition.

The functions and the steps described above can be performed by means of a computer program or by using hardware components (e.g. programmable gate arrays). In particular, the functions and the steps performed by the station 1, and in particular by the control unit, may be performed by sets of computer instructions performed in a (micro)processor or controller or they may be performed by dedicated electronic components or by components of the field programmable gate array (FPGA) or application specific integrated circuit (ASIC) type. It is also possible to combine computer portions with electronic portions.

The computer programs or instructions may be contained in program storage devices, e.g. computer-readable non-transient digital data storage media, e.g. a non-volatile memory. The programs or instructions may also be executed from program storage peripherals.

The invention claimed is:

1. An identification or assistance in identification system for identifying or assisting in identifying a product or a set of products of a user, said identification or assistance in identification system comprising:
 a counter for receiving said product or set of products;
 a lighting system for lighting the counter;
 a plurality of image acquisition devices pointing towards the counter so as to acquire images of said product or set of products at different viewing angles, at least one of the image acquisition devices serving to provide a video stream; and
 a display screen;
wherein said system further comprises:
 a first database storing user account data, each user account comprising:
  an identifier of a user;
  a credit or debit balance value;
 an identifier device enabling the user to be identified; and
 a control device configured:
  to detect said product or set of products being placed on the counter; and
  to display on the display screen the video stream of the product or the set of products present on the counter, together with information defined as a function of the position of the product or the set of products relative to the counter to indicate whether the product or the set of products is positioned correctly;
  on the basis of the images of the video stream and as a function of at least one predefined rule, to determine whether the product or the set of products is or is not correctly positioned relative to the counter;
  to authorize the acquisition of the user identifier by means of the identifier device when said product or set of products relative to the counter is correctly positioned relative to the counter;
  to acquire an identifier of the user; and
  to determine whether the acquired identifier of the user corresponds to the identifier of the user of a stored user account;
  following the identification of the user, to acquire images of said product or set of products by using said image acquisition devices; and
  to associate the acquired images with the identifier of the user in a second database.

2. The identification or assistance in identification system according to claim 1, wherein the system includes a third database containing datasets referred to as orders, each dataset comprising the identifier of the user and a value corresponding to the sale price of said product or set of products.

3. The identification or assistance in identification system according to claim 1, wherein each user account contains user rights information for indicating whether or not the user associated with the user account is authorized to use said identification or assistance in identification system; and the control device is configured, after determining the user account that corresponds to the acquired user identifier, to authorize or to refuse the use of the system as a function of the user rights information associated with said user account.

4. The identification or assistance in identification system according to claim 1, wherein the control device is configured, on the basis of the images of the video stream and as a function of at least one predefined rule, to determine whether the product or the set of products is or is not correctly positioned relative to the counter.

5. The identification or assistance in identification system according to claim 1, wherein the control device is configured to trigger the acquisition of images of said product or set of products as a function of characteristics of the acquired user identifier.

6. The identification or assistance in identification system according to claim 1, wherein the system includes a back face that extends substantially orthogonally to the counter, the back face absorbing daylight less than the counter, and in that said image acquisition devices comprise a first image acquisition device having its optical axis oriented perpendicularly to the counter, and second and third image acquisition devices arranged on either side of a plane containing the optical axis of the first image acquisition device and perpendicular to the back face, the optical axes pointing towards the counter and sloping in mutually opposite directions relative to the optical axis of the first image acquisition device.

7. The identification or assistance in identification system according to claim 1, wherein at least one of the image acquisition devices serves to deliver a video stream, the system being characterized in that, in order to perform the step of acquiring images, the control device is configured to extract an image from said video stream acquired by one of the image acquisition devices.

8. The identification or assistance in identification system according to claim 1, wherein each image acquisition device comprises a CCD sensor, and the control device is configured to detect an ambient brightness and to adjust the sensitivity of the CCD sensors as a function of the measured ambient brightness.

9. The identification or assistance in identification system according to claim 1, wherein the lighting system comprises lighting devices and a light diffusion device.

10. The identification or assistance in identification system according to claim 9, wherein the light diffusion device presents a face facing towards the counter, which face is curved.

11. The identification or assistance in identification system according to claim 1, wherein the counter is made as a single piece and presents, beside the back face, a raised edge limiting any risk of infiltration into a station.

12. The identification or assistance in identification system according to claim 1, wherein a station includes a chamber housing the lighting system, and said chamber extends above and is spaced apart from the counter, said chamber presenting a front portion of width that is greater than the width of the counter.

13. The identification or assistance in identification system according to claim 1, wherein the control device is also configured, after the identifier of the user has been associated with the acquired images, to control a device for authorizing exit or for issuing an indication so as to allow or invite the user to take away the product or the set of products.

* * * * *